United States Patent
Kim et al.

(10) Patent No.: US 7,095,703 B2
(45) Date of Patent: Aug. 22, 2006

(54) APPARATUS AND METHOD FOR RECORDING MARK

(75) Inventors: Seong-sue Kim, Seoul (KR); Du-seop Yoon, Suwon-si (KR); In-sik Park, Suwon-si (KR); Dong-ho Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 10/374,715

(22) Filed: Feb. 27, 2003

(65) Prior Publication Data

US 2003/0174615 A1    Sep. 18, 2003

Related U.S. Application Data

(60) Provisional application No. 60/359,668, filed on Feb. 27, 2002.

(30) Foreign Application Priority Data

May 20, 2002   (KR) ..................... 10-2002-0027866

(51) Int. Cl.
*G11B 7/00* (2006.01)
(52) U.S. Cl. ................. 369/116; 369/53.19; 369/53.28
(58) Field of Classification Search ................. 369/116
See application file for complete search history.

(56) References Cited

U.S. PATENT DOCUMENTS

| | | | |
|---|---|---|---|
| 5,546,372 A * | 8/1996 | Ohsawa et al. | 369/116 |
| 5,621,717 A * | 4/1997 | Finkelstein et al. | 369/112.16 |
| 6,473,378 B1 * | 10/2002 | Sato et al. | 369/53.14 |
| 6,560,178 B1 * | 5/2003 | Lee et al. | 369/53.19 |
| 2002/0105878 A1 * | 8/2002 | Ogata et al. | 369/53.19 |
| 2002/0176331 A1 * | 11/2002 | Ariyoshi et al. | 369/44.23 |
| 2003/0075669 A1 * | 4/2003 | Tadaki | 250/201.5 |

OTHER PUBLICATIONS

U.S. Appl. No. 09/984,886, filed Oct. 31, 2001, Kim et al.
U.S. Appl. No. 09/986,454, filed Nov. 8, 2001, Ma et al.
Hurst, et al. "Optical Data Storage 2001." Proceedings of SPIE. vol. 4342, Apr. 22-25, 2001, pp. 457-462.

* cited by examiner

*Primary Examiner*—William Korzuch
*Assistant Examiner*—Tawfik Goma
(74) *Attorney, Agent, or Firm*—Stein, McEwen & Bui, LLP (57) ABSTRACT

A recording apparatus to record a mark on a recording medium includes an aberration detecting part and an optical power controller. The aberration detecting part detects an aberration signal corresponding to the amount of an aberration contained in a light beam radiated onto a recording surface of the recording medium by using an optical pickup system which includes a light source and an objective lens. The light source emits a light beam having a power to record the mark on the recording medium. The objective lens condenses the light beam to focus the light beam as an optical spot on the recording surface of the recording medium. The optical power controller controls the power output from the light source according to the detected aberration signal, so as to have the light source output an optical power to record the mark, in which a deformation due to the aberration is compensated for, on the recording medium. Accordingly, even though the aberration occurs, a proper mark in which the deformation due to the aberration is compensated for can be recorded by increasing the recording power of the light source in proportion to the amount of the aberration to compensate for the aberration. As a result, the mark showing a good signal characteristic can be recorded on the recording medium without an additional aberration compensating device.

19 Claims, 6 Drawing Sheets

APPARATUS AND METHOD FOR RECORDING MARK

CROSS-REFERENCE TO RELATED APPLICATIONS

This application claims the benefit of Korean Patent Application No. 2002-27866 filed on May 20, 2002 in the Korean Intellectual Property Office and U.S. Provisional Patent Application No. 60/359,668 filed on Feb. 27, 2002 in the United States Patent and Trademark Office, the disclosures of which are incorporated herein by reference.

BACKGROUND OF THE INVENTION

1. Field of the Invention

The present invention relates to an optical recording, and more particularly, to an apparatus and a method of preventing deformation of a recorded mark due to at least one of a spherical aberration due to a thickness deviation of a recording medium, and a coma aberration due to a relative radial tilting and tangential tilting between the recording medium and an objective lens, so that a proper mark can be recorded.

2. Description of the Related Art

Generally, an information recording and/or reproducing density increases as the size of an optical spot focused on a recording medium by an optical pickup decreases. As shown in the Equation 1 below, the size of the optical spot is reduced as the wavelength λ of a used light beam gets shorter and the numerical aperture NA of an objective lens gets larger.

$$\text{Spot Size } \alpha \lambda/\text{NA} \qquad (1)$$

Therefore, to obtain a high recording density, a short wavelength light source, such as a blue semiconductor laser, and an objective lens having a large NA should be used in the optical pickup to reduce the size of the optical spot focused on the recording medium. In this technical field, a standardization of a high density recording medium, which uses a blue light source and an objective lens having an NA of about 0.85, increases a recording capacity to more than 20 GB, and whose thickness is reduced to about 0.1 mm, i.e., a next generation DVD, is proceeding.

However, a spherical aberration $W_{40}$ is proportional to the $4^{th}$ power of the NA of the objective lens and a thickness deviation of the recording medium. Thus, the recording medium has to have as uniform a thickness as possible to use an objective lens having an NA of about 0.85. But, it is very difficult to manufacture a recording medium having a uniform thickness of about 0.1 mm. Therefore, the spherical aberration proportional to the thickness deviation of the recording medium should be compensated for to properly record a mark on the recording medium. Here, the thickness of the recording medium refers to a distance between a surface upon which light is incident and a recording surface of the recording medium.

Additionally, a coma aberration is proportional to the cube of the NA of the objective lens and is caused by tilting of the recording medium (radial tilting and tangential tilting of the recording medium relative to the objective lens). Thus, if an objective lens having an NA of about 0.85 is used, the coma aberration should be compensated for to properly record a mark on the recording medium.

SUMMARY OF THE INVENTION

Accordingly, it is an aspect of the present invention to provide an apparatus and a method of properly recording a mark by compensating for a spherical aberration and a coma aberration caused by a relative tilting between a recording medium and an objective lens, without an additional aberration compensating device.

Additional aspects and advantages of the invention will be set forth in part in the description which follows and, in part, will be obvious from the description, or may be learned by practice of the invention.

To achieve the above and/or other aspects of the present invention, there is provided a recording apparatus to record a mark on a recording medium, comprising an aberration detecting part and an optical power controller. The aberration detecting part detects an aberration signal corresponding to an amount of an aberration contained in a light beam radiated onto a recording surface of the recording medium using an optical pickup system including a light source that emits a light beam having an optical power to record the mark on the recording medium and an objective lens that condenses the light beam to focus the light beam as an optical spot on the recording surface of the recording medium. The optical power controller controls the optical power output from the light source using the aberration signal, so as to have the light source output the optical power to record the mark, in which a deformation due to the aberration is compensated for, on the recording medium.

The aberration detecting part may detect the aberration signal corresponding to at least one of a spherical aberration due to a thickness variation of the recording medium, a first type coma aberration due to a radial tilting of the recording medium, and a second-type coma aberration due to a tangential tilting of the recording medium, so as to record the mark having the deformation being compensated for where at least one of the spherical, first-type and second-type aberrations occurs.

To achieve the above and/or other aspects of the present invention, there is provided a method of recording a mark on a recording medium, the method comprising detecting an aberration signal corresponding to an amount of an aberration contained in a light beam radiated onto a recording surface of the recording medium using an optical pickup system including a light source that emits the light beam having an optical power to record the mark on the recording medium and an objective lens that condenses the light beam to focus the light beam as an optical spot on the recording surface of the recording medium, controlling the optical power output from the light source using the aberration signal, so as to have the light source output the optical power to record the mark, in which a deformation due to the aberration is compensated for, on the recording medium, and recording the mark in which the deformation due to the aberration is compensated for using the light beam having the controlled optical power output from the light source.

The detecting of the aberration signal may include detecting the aberration signal corresponding to at least one of a spherical aberration due to a thickness variation of the recording medium, a first-type coma aberration due to a radial tilting of the recording medium, and a second-type coma aberration due to a tangential tilting of the recording medium, so as to record the mark having the deformation being compensated for where at least one of the spherical, first-type and second-type aberrations occurs.

The recording medium may be a phase-change disc.

In the recording apparatus, the optical power controller may control the optical power output from the light source so as to apply an optical power $P_1$ within a range of ±20% of a power $\gamma_1 P_0$ to record the mark, where the light source emits a light beam having a wavelength corresponding to a blue light, the numerical aperture of the objective lens is 0.85±0.05, a thickness of the recording medium is 0.1±0.05 mm, and a spherical aberration corresponding to a coefficient $W_{40}$ of less than 0.15 occurs. The power $\gamma_1 P_0$ is obtained by multiplying a recording power $P_0$ of the light source, in which the aberration does not occur, by a compensation coefficient $\gamma_1$ which satisfies the relationship: $\gamma_1=1.9\times W_{40}+0.91$.

The optical power controller may control the optical power output from the light source so as to apply an optical power $P_2$ within a range of ±20% of a power $\gamma_2 P_0$ to record the mark, where the light source emits a light beam having a wavelength corresponding to a blue light, the numerical aperture of the objective lens is 0.85±0.05, a thickness of the recording medium is 0.1±0.05 mm, and a spherical aberration corresponding to a coefficient $W_{40}$ of more than 0.15 occurs. The power $\gamma_2 P_0$ is obtained by multiplying a recording power $P_0$ of the light source, in which the aberration does not occur, by a compensation coefficient $\gamma_2$ which satisfies the relationship: $\gamma_2=4\times W_{40}\pm 0.6$.

The optical power controller may control the optical power output from the light source so as to apply an optical power $P_3$ within a range of ±20% of a power $\gamma_3 P_0$ to record the mark, where the light source emits a light beam having a wavelength corresponding to a blue light, the numerical aperture of the objective lens is 0.85±0.05, a thickness of the recording medium is 0.1±0.05 mm, and a coma aberration corresponding to a coefficient $W_{31}$ of less than 0.15 occurs. The power $\gamma_3 P_0$ is obtained by multiplying the recording power $P_0$ of the light source in which aberration does not occur by a compensation coefficient $\gamma_3$ which satisfies the relationship: $\gamma_3=1.5\times W_{31}+0.94$.

The optical power controller may control the optical power output from the light source so as to apply an optical power $P_4$ within a range of ±20% of a power $\gamma_4 P_0$ to record the mark, where the light source emits a light beam having a wavelength corresponding to a blue light, the numerical aperture of the objective lens is 0.85±0.05, a thickness of the recording medium is 0.1±0.05 mm, and a coma aberration corresponding to a coefficient $W_{31}$ of more than 0.15 occurs. The power $\gamma_4 P_0$ is obtained by multiplying the recording power $P_0$ of the light source in which aberration does not occur by a compensation coefficient $\gamma_4$ which satisfies the relationship: $\gamma_4=3.1\times W_{31}+0.7$.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 1:
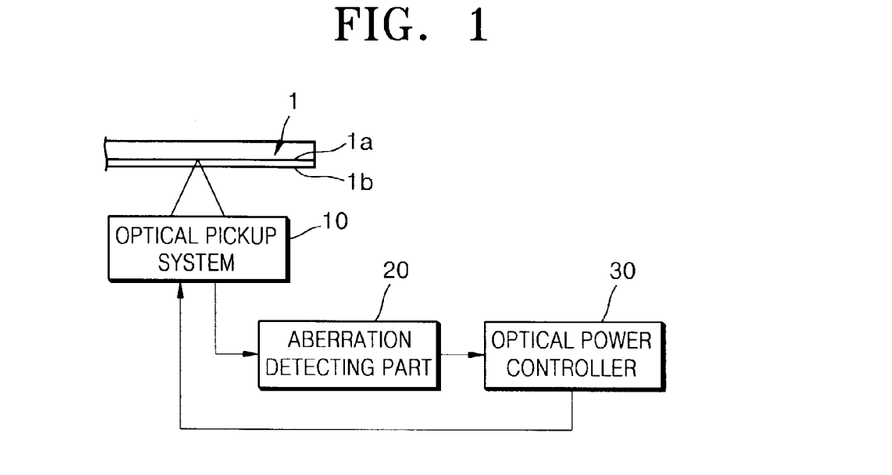
FIG. 1 is a schematic block diagram of a drive system having a recording apparatus according to the present invention.
Figure 2:
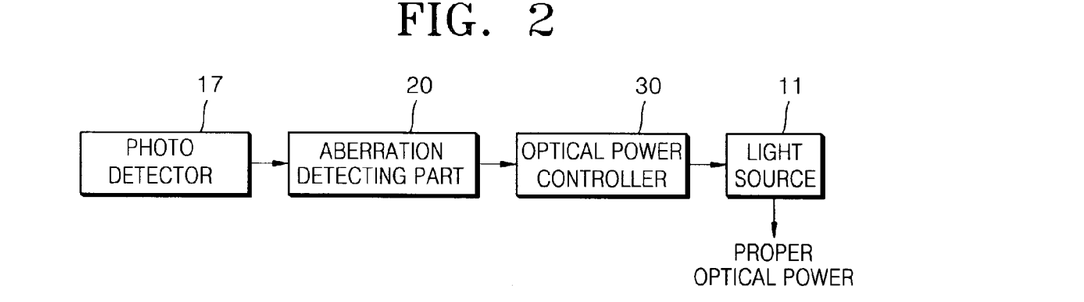
FIG. 2 is a block diagram of the recording apparatus shown in FIG. 1 according to an embodiment of the present invention.

FIG. 1 shows a block diagram of a drive system having a recording apparatus according to the present invention. FIG. 2 shows a block diagram of the recording apparatus shown in FIG. 1 according to an embodiment of the present invention. Referring to FIGS. 1 and 2, the recording apparatus includes an aberration detecting part 20 and an optical power controller 30. The aberration detecting part 20 detects an aberration signal, which corresponds to the amount of an aberration included in a light beam radiated onto a recording surface 1a of an optical disc 1, which is a recording medium, by an optical pickup system 10. The optical power controller 30 controls an optical power output from a light source 11 using the aberration signal.

The optical pickup system 10 includes the light source 11 and an objective lens (not shown). The light source 11 emits the light beam having a wavelength suitable for recording a mark on the optical disc 1. The objective lens condenses the light beam emitted from the light source 11 to focus an optical spot on the recording surface 1a of the optical disc 1. The optical pickup system 10 has an optical structure to detect the aberration included in the light beam radiated onto the recording surface 1a of the optical disc 1. The aberration includes, for example, at least one of a spherical aberration, a coma aberration caused by a radial tilting, and a coma aberration resulting from a tangential tilting.

The aberration detecting part 20 detects the aberration signal, which corresponds to the amount of the aberration in the light beam radiated onto the recording surface 1a of the optical disc 1, using a detection signal emitted from a photodetector 17.

Figure 3:
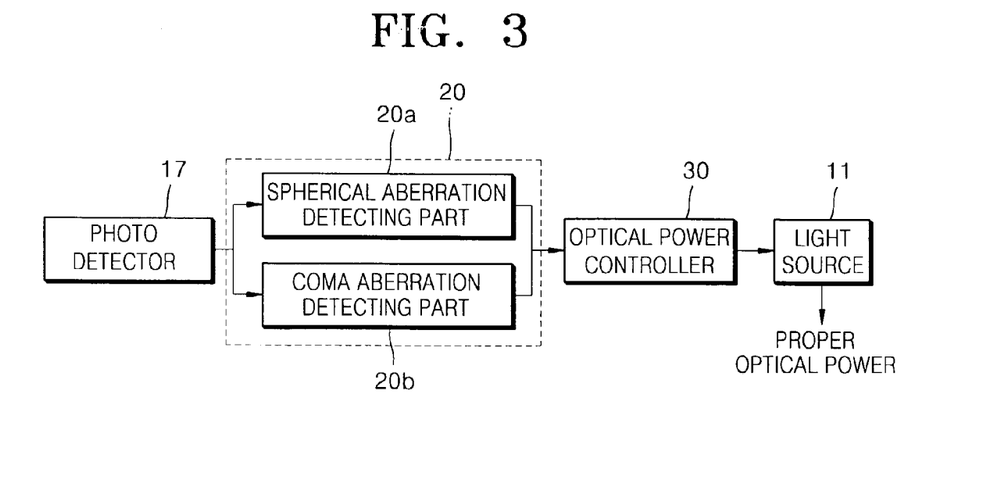
FIG. 3 is a block diagram of a recording apparatus according to another embodiment of the present invention.

FIG. 3 shows a recording apparatus according to another embodiment of the present invention. As shown in FIG. 3, the aberration detecting part 20 includes a spherical aberration detecting part 20a, which detects a spherical aberration resulting from a thickness variation of the optical disc 1, and a coma aberration detecting part 20b, which detects a coma aberration caused by a tilting of the optical disc 1 (tilting relative to the objective lens). Alternatively, the aberration detecting part 20 may detect only the spherical aberration or only the coma aberration.

Here, a thickness variation of the optical disc 1 may include a thickness difference between optical discs manufactured to have the same format, a thickness deviation between different regions of an individual optical disc, and a thickness difference between optical discs having different formats. The thickness of the optical disc 1 refers to the distance between a light incident surface 1b and the recording surface 1a.

A tilting of the optical disc 1 which causes the coma aberration may include a radial tilting (tilting in a radial direction of the optical disc 1) and a tangential tilting (tilting in a tracking direction of the optical disc 1). Thus, the coma aberration detecting part 20b may detect an aberration signal corresponding to a coma aberration resulting from a radial tilting and a tangential tilting or an aberration signal corresponding to a coma aberration caused by one of a radial tilting and a tangential tilting.

Where the aberration detecting part 20 detects the aberration signal corresponding to at least one of the spherical aberration and the coma aberration, the optical pickup system 10 of the drive system having the recording apparatus of the present invention has an optical structure to detect such an aberration signal.

The optical power controller 30 controls an optical power output from the light source 11 using the aberration signal detected by the aberration detecting part 20 so as to record a proper mark, in which a deformation due to the aberration is compensated for, on the optical disc 1. As observed in an experiment that will be described later, an aberration leads to a reduction in a peak value of a beam intensity distribution. Thus, the optical power controller 30 controls the optical power so as to increase the optical power according to the amount of the aberration.

According to a first aspect of the present invention, where the light source 11 emits a light beam having a wavelength corresponding to a blue light, the NA of the objective lens is 0.85±0.05, the thickness of the optical disc 1 is 0.1±0.05 mm, and a spherical aberration corresponding to a coefficient $W_{40}$ of less than 0.15 occurs, the optical power controller 30 controls an optical power output from the light source 11 so as to apply an optical power $P_1$ within a range of ±20% of a power $\gamma_1 P_0$ to record a mark, in which a deformation due to the spherical aberration is compensated for, on a recording medium. Here, the power $\gamma_1 P_0$ is obtained by multiplying a recording power $P_0$ of the light source 11 having no aberration by a compensation coefficient $\gamma_1$ calculated with the Equation 2 below.

$$\gamma_1 = 1.9 \times W_{40} + 0.91 \quad (2)$$

According to a second aspect of the present invention, where the light source 11 emits a light beam having a wavelength corresponding to a blue light, the NA of the objective lens is 0.85±0.05, the thickness of the optical disc 1 is 0.1±0.05 mm, and a spherical aberration corresponding to a coefficient $W_{40}$ of more than 0.15 occurs, the optical power controller 30 controls an optical power output from the light source 11 so as to apply an optical power $P_2$ within a range of ±20% of a power $\gamma_2 P_0$ to record a mark, in which a deformation due to the spherical aberration is compensated for, on a recording medium. Here, the power $\gamma_1 P_0$ is obtained by multiplying a recording power $P_0$ of the light source 11 having no aberration by a compensation coefficient $\gamma_2$ calculated with the Equation 3 below.

$$\gamma_2 = 4 \times W_{31} + 0.6 \quad (3)$$

According to a third aspect of the present invention, where the light source 11 emits a light beam having a wavelength corresponding to a blue light, the NA of the objective lens is 0.85±0.05, the thickness of the optical disc 1 is 0.1±0.05 mm, and a coma aberration corresponding to a coefficient $W_{31}$ of less than 0.15 occurs, the optical power controller 30 controls an optical power output from the light source 11 so as to apply an optical power $P_3$ within a range of ±20% of a power $\gamma_3 P_0$ to record a mark, in which a deformation due to the coma aberration is compensated for, on a recording medium. Here, the power $\gamma_3 P_0$ is obtained by multiplying a recording power $P_0$ of the light source 11 having no aberration by a compensation coefficient $\gamma_3$ calculated with the Equation 4 below.

$$\gamma_3 = 1.5 \times W_{31} + 0.94 \quad (4)$$

According to a fourth aspect of the present invention, where the light source 11 emitted a light beam having a wavelength corresponding to a blue light, the NA of the objective lens is 0.85±0.05, the thickness of the optical disc 1 is 0.1±0.05 mm, and a coma aberration corresponding to a coefficient $W_{31}$ of more than 0.15 occurs, the optical power controller 30 controls an optical power output from the light source 11 so as to apply an optical power $P_4$ within a range of ±20% of a power $\gamma_4 P_0$ to record a mark, in which a deformation due to the coma aberration is compensated for, on a recording medium. Here, the power $\gamma_4 P_0$ is obtained by multiplying a recording power $P_0$ of the light source 11 having no aberration by a compensation coefficient $\gamma_4$ calculated with the Equation 5 below.

$$\gamma_4 = 3.1 \times W_{31} + 0.7 \quad (5)$$

A process of recording a mark using the recording apparatus having the above-described structure according to the present invention will be described.

For example, an aberration signal, which corresponds to the amount of an aberration included in a light beam radiated onto the recording surface 1a of the optical disc 1, is detected.

An optical power output from the light source 11 is controlled using the aberration signal, so that the light source 11 emits a light beam having a suitable power to record a proper mark, in which a deformation is compensated for, on the recording surface 1a of the optical disc 1. In general, an aberration leads to a reduction in a peak value of a beam intensity distribution. Thus, in the present invention the power of a light beam output from the light source 11, where an aberration occurs, is increased correspondingly to the amount of the aberration.

A light beam having a proper power output from the light source 11 is focused as an optical spot on the recording surface 1a of the optical disc 1. Thus, a mark, which is identical to a mark recorded where the aberration does not occur, is recorded due to the proper beam intensity distribution of the optical spot focused on the recording surface 1a. In other words, a proper mark, in which a deformation due to the aberration is compensated for, is recorded on the recording surface 1a of the optical disc 1.

As described above, according to the present invention, even where an aberration occurs, a proper mark, in which a deformation due to the aberration is compensated for, can be recorded. In particular, the aberration detecting part 20 can detect an aberration signal corresponding to at least one of a spherical aberration resulting from a thickness variation of the optical disc 1, a coma aberration resulting from a radial tilting of the optical disc 1, and a coma aberration caused by a tangential tilting of the optical disc 1. Accordingly, although one or more types of an aberration may occur, a proper mark, in which a deformation due to the aberration is compensated for, can be recorded.

The present invention is suitable for recording a mark on a phase-change disc 1, and can be useful for a recording apparatus and a recording method for CD-Rs, CD-RWs, DVD-RWs, DVD+RWs, DVD-RAMs, and next generation recordable DVDs (known as, for example, HD-DVDs).

Hereinafter, a method of recording a proper mark, in which a deformation due to an aberration is compensated for, will be described with reference to experimental simulation results.

Figure 4:
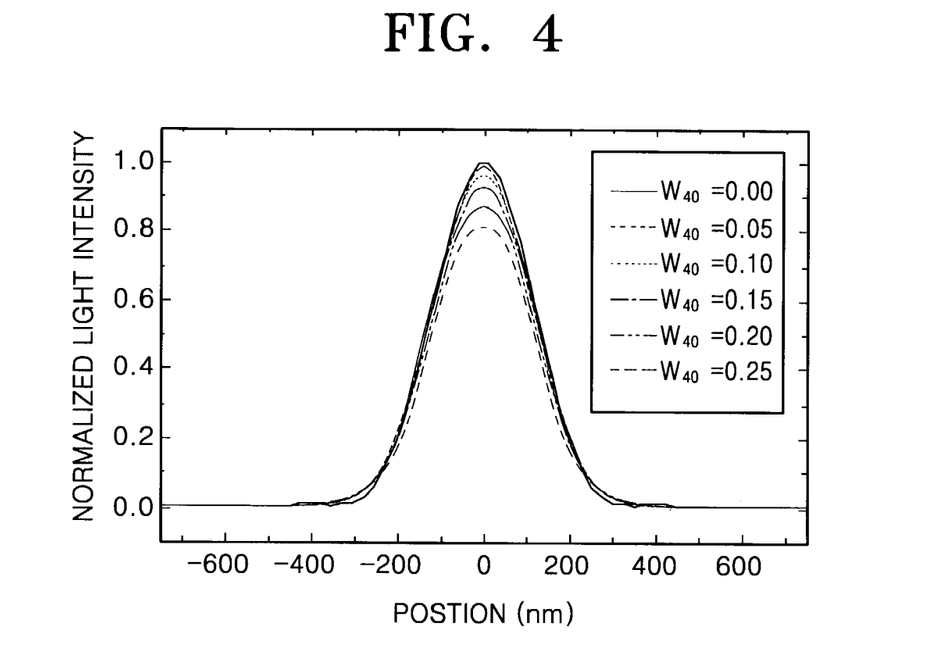
FIG. 4 is a graph illustrating a beam intensity distribution at a focal point with respect to the amount of a spherical aberration.
Figure 5:
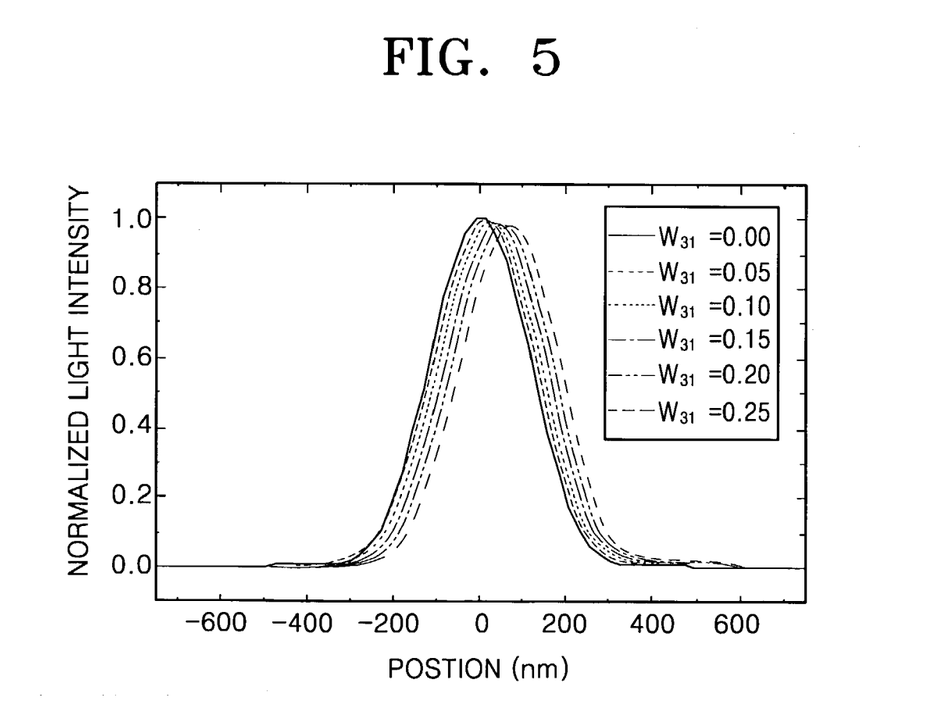
FIG. 5 is a graph illustrating a beam intensity distribution at a focal point with respect to the amount of a coma aberration.

FIGS. 4 and 5 show that a spherical aberration and a coma aberration cause changes in a beam intensity distribution (intensity distribution of an optical spot focused on the recording surface 1a of the optical disc 1 where an objective lens is in an on-focus position) at a focal point of the objective lens. That is, FIGS. 4 and 5 illustrate changes in the beam intensity distribution at the focal point with respect to the amount of the spherical aberration and the coma aberration, respectively. In FIGS. 4 and 5, $W_{40}$ and $W_{31}$ respectively represent a spherical aberration coefficient and a coma aberration coefficient corresponding to the amount of the spherical aberration and the amount of the coma aberration.

As shown in FIG. 4, a peak value of the beam intensity distribution at the focal point decreases as the amount of the spherical aberration increases. Thus, a recording power has to be increased in consideration of the amount of the spherical aberration, so as to record a proper mark even where the spherical aberration occurs.

As shown in FIG. 5, a peak value of the beam intensity distribution at the focal point decreases as the amount of the coma aberration increases. Also, the position of the peak value of the beam intensity distribution, i.e., the position of the optical spot, is shifted. Thus, a recording power has to be increased in consideration of the amount of the coma aberration, so as to record a proper mark even where the coma aberration occurs. Here, the shift of the position of the optical spot due to the coma aberration results in a shift of the position of a mark recorded. However, as will be described later, where the position of the mark is uniformly shifted, a distance between marks in a radial direction and/or a distance between the marks in a tracking direction can be maintained as desired. Thus, the shift of the position of the optical spot due to the coma aberration is less of a factor in recording a proper mark.

As shown in FIGS. 4 and 5, the spherical aberration and the coma aberration lead to a reduction in the peak value of the beam intensity distribution of the optical spot. Thus, where the optical power of a light source is increased in consideration of the amount of the spherical aberration and coma aberration, a proper mark, in which a deformation due to the aberration is compensated for, can be recorded even where the aberration occurs.

Figure 6:
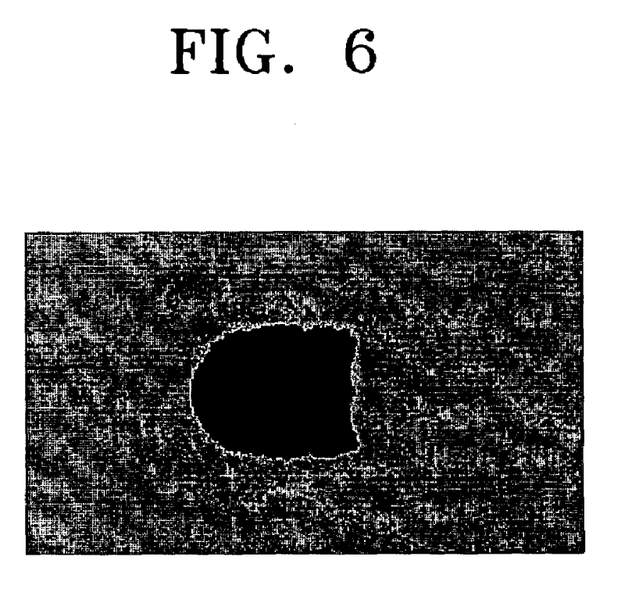
FIG. 6 is a view of a mark recorded on a phase-change disc in which a spherical aberration and a coma aberration do not occur.
Figure 7:
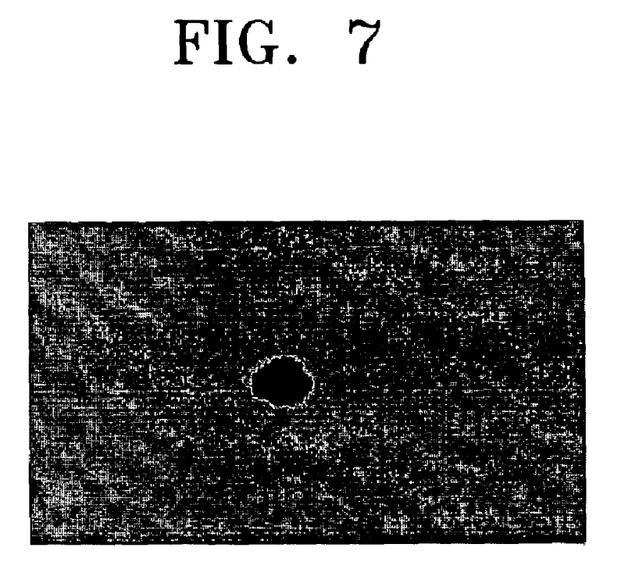
FIG. 7 is a view of a mark recorded on a phase-change disc using a beam intensity distribution having a spherical aberration corresponding to a spherical aberration coefficient $W_{40}$ of 0.25.
Figure 8:
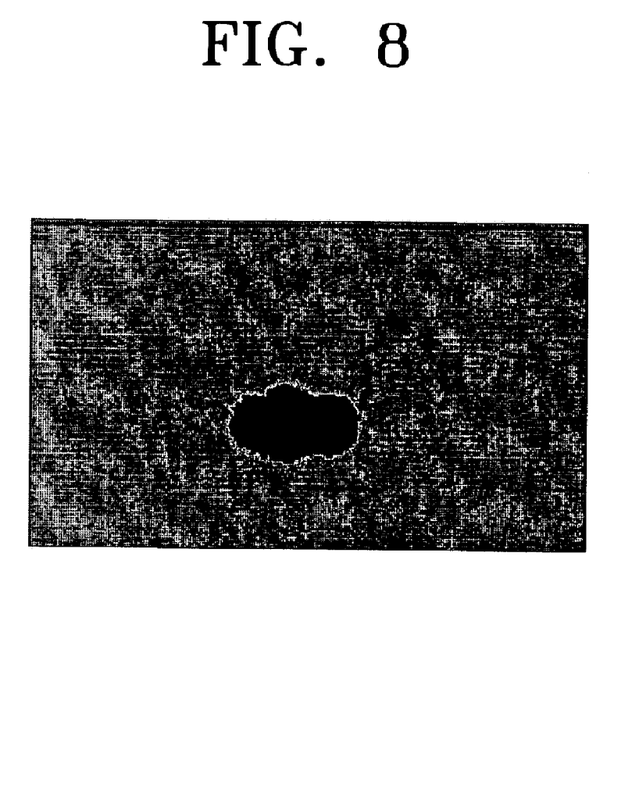
FIG. 8 is a view of a mark recorded on a phase-change disc using a beam intensity distribution having a coma aberration corresponding to a coma aberration coefficient $W_{31}$ of 0.25 arising from a radial tilting.

FIG. 6 shows a mark recorded on a phase-change disc where a spherical aberration and a coma aberration do not occur. FIG. 7 shows a mark recorded on a phase-change disc where a spherical aberration corresponding to a coefficient $W_{40}$ of 0.25 occurs. FIG. 8 shows a mark recorded on a phase-change disc where a coma aberration corresponding to a coefficient $W_{31}$ of 0.25 occurs due to a radial tilting.

Figure 9:
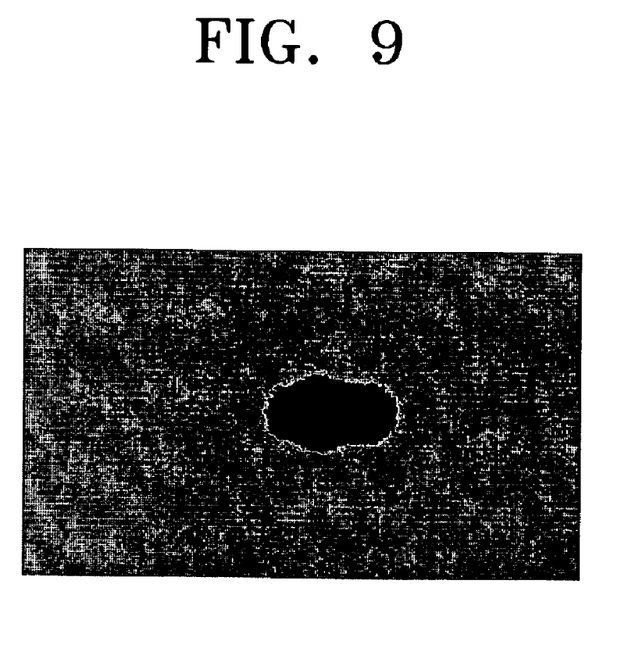
FIG. 9 is a view of a mark recorded on a phase-change disc using a beam intensity distribution having a coma aberration corresponding to a coma aberration coefficient $W_{31}$ of 0.25 due to a tangential tilting.

FIG. 9 shows a mark recorded on a phase-change disc where a coma aberration corresponding to a coefficient $W_{31}$ of 0.25 results from a tangential tilting. The marks shown in FIGS. 6 through 9 were recorded under the following conditions: the wavelength was 405 nm, the NA was 0.85, and the light source radiated light beams having the same power on a phase-change disc having a thickness of 0.1 mm.

An aberration leads to a reduction in a peak value of a beam intensity distribution. Thus, as shown in FIGS. 7 through 9, marks are not properly recorded where the respective aberration occurs, compared to the mark of FIG. 6 recorded without an aberration.

The position of a mark recorded where an aberration does not occur and the position of a mark recorded where an aberration does occur are follows. Comparing the mark shown in FIG. 6 and the mark shown in FIG. 7, where a spherical aberration occurs, the marks are recorded in the same position. Comparing the mark shown in FIG. 6 and the mark shown in FIG. 8, where a coma aberration occurs due to a radial tilting, as shown in FIG. 8, the position of the recorded mark deviates upward or downward from the position of the mark of FIG. 6 recorded without the aberration. Comparing the mark shown in FIG. 6 and the mark shown in FIG. 9, where a coma aberration occurs due to a tangential tilting, as shown in FIG. 9, the position of the recorded mark deviates to a side of the recording center, compared to the mark of FIG. 6 recorded without the aberration.

Figure 10:
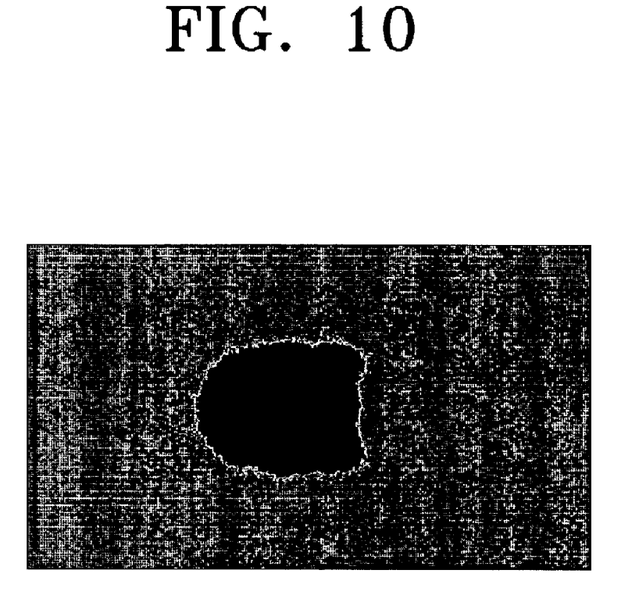
FIG. 10 is a view of a mark recorded on a phase-change disc under the same conditions as the mark shown in FIG. 7 except that the beam intensity distribution is increased to 1.6 times, according to the present invention.
Figure 11:
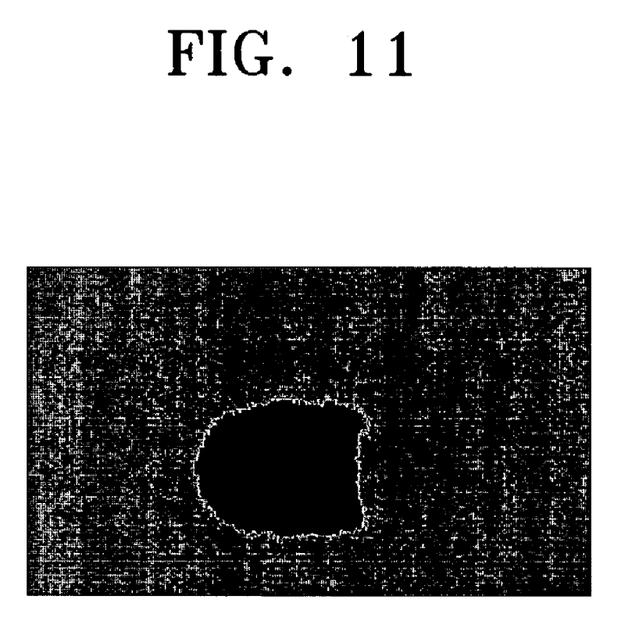
FIG. 11 is a view of a mark recorded on a phase-change disc under the same conditions as the mark shown in FIG. 8 except that the beam intensity distribution is increased to 1.45 times, according to the preset invention.
Figure 12:
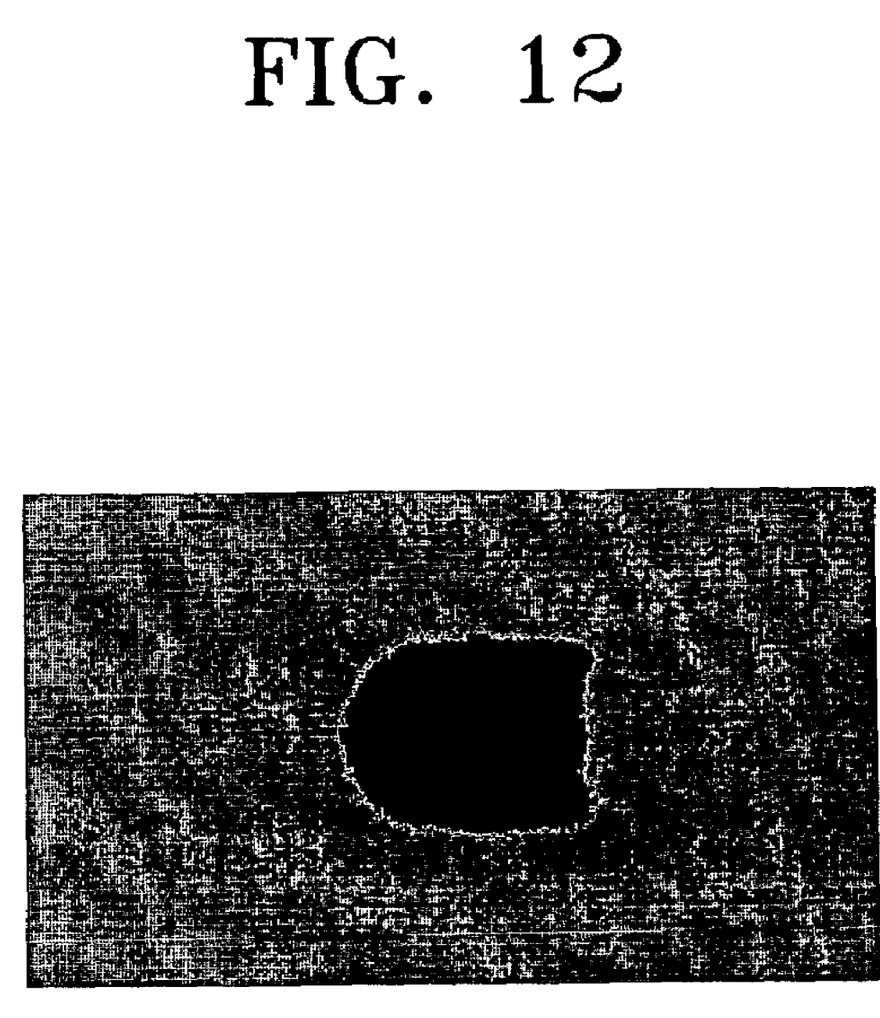
FIG. 12 is a view of a mark recorded on a phase-change disc under the same conditions as the mark shown in FIG. 9 except the beam intensity distribution is increased to 1.46 times, according to the present invention.

FIGS. 10, 11, and 12 show marks recorded under the same conditions as the marks shown in FIGS. 7 through 9, except that the beam intensity distribution is increased to 1.6 times, 1.45 times, and 1.46 times, respectively, according to the present invention.

As shown in FIGS. 10 through 12, even though a spherical aberration, a coma aberration due to a radial tilting, and/or a coma aberration due to a tangential tilting occurs, characteristics of the mark signals recorded on the phase-change disc can be improved by increasing a recording power to an appropriate amount.

In other words, where the recording power emitted from the light source is adjusted to the appropriate amount to compensate for the aberration, as shown in FIGS. 10 through 12, marks can be recorded with sizes equal or similar to the size of the mark of FIG. 6 recorded where an aberration did not occur. As seen in FIGS. 11 and 12, in the cases where a coma aberration occurs due to a radial tilting and a tangential tilting, even though the recording power is controlled, the marks are not recorded in the same position as the mark of FIG. 6 recorded without the aberration. However, where the radial tilting and the tangential tilting continue to occur during the recording of marks on the phase-change disc, since the position of all marks deviate from the intended recording center by the same displacement, the position deviation of the marks does not significantly affect the desired outcome.

As described above, it is possible to record marks having almost the same size regardless of an aberration by increasing a recording power in proportion to the amount of the aberration. Thus, by using the present invention, characteristics of mark signals recorded on an optical disc can be considerably improved.

Referring back to FIGS. 1 through 3, a drive system having the above-described recording apparatus includes the light source 11, which emits a light beam having a power suitable to record marks on the optical disc 1, and an objective lens (not shown), which condenses the light beam to focus an optical spot on the recording surface 1a of the optical disc 1 and detects at least one of a spherical aberration and a coma aberration. The optical pickup system 10 which detects a spherical aberration or a coma aberration (a tilt error signal or the amount of tilting), a spherical aberration detection technique, and a coma aberration detection technique are known in the art.

For example, the drive system having the recording apparatus according to the present invention may use an optical pickup system and a spherical aberration detection technique disclosed in "Measuring Spherical Aberration for the Dynamic Compensation of Substrate-Thickness Error," Optical Data Storage Topical Meeting 2001, Santa Fe, N. Mex. April 2001, pages 106–108.

Also, the drive system having the recording apparatus according to the present invention may use an optical pickup device and a spherical aberration detection technique disclosed in U.S. patent application Ser. No. 09/984,886 corresponding to Korean Patent Application No. 2000-74797, by the same applicant as the present application.

In the instant case, the drive system having the recording apparatus according to the present invention does not require a spherical aberration compensating device as described in U.S. patent application Ser. No. 09/984,886. In other words, in the case where the optical pickup device disclosed in U.S. patent application Ser. No. 09/984,886 is used as the optical pickup system 10 in the drive system having the recording apparatus according to the present invention, the recording apparatus according to the present invention adjusts a power output from the light source 11 to a proper amount to compensate for a spherical aberration. Thus, since a proper mark in which a deformation due to the spherical aberration is compensated for can be recorded, the spherical aberration compensating device of the U.S. patent application Ser. No. 09/984,886 is not needed in the instant case.

Furthermore, the drive system having the recording apparatus according to the present invention may use an optical pickup device and a tilt signal detection technique to detect an amount of a tilting corresponding to a coma aberration disclosed in U.S. patent application Ser. No. 09/986,454, corresponding to Korean Patent Application No. 2000-68501 by the applicant of the present application.

The U.S. patent application Ser. No. 09/986,454 discloses a detecting technique to detect a radial tilting error signal and/or a tangential tilting error signal. An amount of a radial tilting and/or an amount of a tangential tilting, or an amount of a coma aberration corresponding to the radial tilting and/or the tangential tilting can be calculated using the radial tilting error signal and/or the tangential tilting error signal. Thus, a coma aberration signal can be detected by using the technique disclosed in U.S. patent application Ser. No. 09/986,454.

To record a mark in which a deformation due to a spherical aberration and a coma aberration is compensated for, an optical pickup system having a complex structure to detect both the spherical aberration and the coma aberration, and respective detection techniques thereof have to be utilized in a drive system having the recording apparatus of the present invention. That is, the optical pickup system 10 shown in FIG. 1 can be realized from the disclosures in the above-described documents and/or applications, and from spherical and/or coma aberration detecting techniques known in the art. Accordingly, the structure optical pickup system 10 and the spherical and/or coma aberration detection techniques will not be described herein.

As described above, according to the present invention, even though an aberration occurs, a proper mark, in which a deformation due to the aberration is compensated for, can be recorded by increasing the recording power of a light source in proportion to the amount of the aberration to compensate for the aberration. As a result, a mark showing a good signal characteristic can be recorded on a recording medium without an additional aberration compensating device.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A recording apparatus to record a mark on a recording medium, comprising:

an aberration detecting part, including a spherical aberration detecting part and a coma aberration detecting part, which detects an aberration signal corresponding to an amount of an aberration contained in a light beam radiated onto a recording surface of the recording medium, using an optical pickup system including a light source that emits the light beam having an optical power to record the mark on the recording medium and an objective lens that condenses the light beam to focus the light beam as an optical spot on the recording surface of the recording medium; and an optical power controller which controls the optical power output from the light source using the aberration signal, so as to have the light source output the optical power to record the mark, in which a deformation due to the aberration is compensated for, on the recording medium, wherein the optical power controller controls the optical power output from the light source so as to apply an optical power $P_1$ within a range of ±20% of a power $\gamma_1 P_0$ to record the mark, where the light source emits the light beam having a wavelength corresponding to a blue light, the numerical aperture of the objective lens is 0.85±0.05, a thickness of the recording medium is 0.1±0.05 mm, and a spherical aberration corresponding to a coefficient $W_{40}$ of less than 0.15 occurs, and the power $\gamma_1 P_0$ is obtained by multiplying a recording power $P_0$ of the light source, in which the aberration does not occur, by a compensation coefficient $\gamma_1$ which satisfies the relationship: $\gamma_1 = 1.9 \times W_{40} + 0.91$.

2. The recording apparatus of claim 1, wherein the aberration detecting part detects the aberration signal corresponding to at least one of a spherical aberration due to a thickness variation of the recording medium, a first-type coma aberration due to a radial tilting of the recording medium, and a second-type coma aberration due to a tangential tilting of the recording medium, so as to record the mark having the deformation being compensated for where at least one of the spherical, first-type coma and second-type coma aberrations occurs.

3. The recording apparatus of claim 2, wherein the recording medium is a phase-change disc.

4. The recording apparatus of claim 1, wherein the recording medium is a phase-change disc.

5. A recording apparatus to record a mark on a recording medium, comprising:

an aberration detecting part, including a spherical aberration detecting part and a coma aberration detecting part, which detects an aberration signal corresponding to an amount of an aberration contained in a light beam radiated onto a recording surface of the recording medium, using an optical pickup system including a light source that emits the light beam having an optical power to record the mark on the recording medium and an objective lens that condenses the light beam to focus the light beam as an optical spot on the recording surface of the recording medium; and an optical power controller which controls the optical power output from the light source using the aberration signal, so as to have the light source output the optical power to record the mark, in which a deformation due to the aberration is compensated for, on the recording medium, wherein the optical power controller controls the optical power output from the light source so as to apply an optical power $P_2$ within a range of ±20% of a power $\gamma_2 P_0$ to record the mark, where the light source emits the light beam having a wavelength corresponding to a blue light, the numerical aperture of the objective lens is 0.85±0.05, a thickness of the recording medium is 0.1±0.05 mm, and a spherical aberration corresponding to a coefficient $W_{40}$ of more than 0.15 occurs, and the power $\gamma_2 P_0$ is obtained by multiplying a recording power $P_0$ of the light source, in which the aberration does not occur, by a compensation coefficient $\gamma_2$ which satisfies the relationship: $\gamma_2 = 4 \times W_{40} + 0.6$.

6. A recording apparatus to record a mark on a recording medium, comprising:

an aberration detecting part, including a spherical aberration detecting part and a coma aberration detecting part, which detects an aberration signal corresponding to an amount of an aberration contained in a light beam radiated onto a recording surface of the recording medium, using an optical pickup system including a light source that emits the light beam having an optical power to record the mark on the recording medium and an objective lens that condenses the light beam to focus the light beam as an optical spot on the recording surface of the recording medium; and an optical power controller which controls the optical power output from the light source using the aberration signal, so as to have the light source output the optical power to record the mark, in which a deformation due to the aberration is compensated for, on the recording medium, wherein the optical power controller controls the optical power output from the light source so as to apply an optical power $P_3$ within a range of 20% of a power $\gamma_3 P_0$ to record the mark, where the light source emits the light beam having a wavelength corresponding to a blue light, the numerical aperture of the objective lens is 0.85±0.05, a thickness of the recording medium is 0.1±0.05 mm, and a coma aberration corresponding to a coefficient $W_{31}$ of less than 0.15 occurs, and the power $\gamma_3 P_0$ is obtained by multiplying a recording power $P_0$ of the light source, in which the aberration does not occur, by a compensation coefficient $\gamma_3$ which satisfies the relationship: $\gamma_3 = 1.5 \times W_{31} + 0.94$.

7. A recording apparatus to record a mark on a recording medium, comprising:

an aberration detecting part, including a spherical aberration detecting part and a coma aberration detecting part, which detects an aberration signal corresponding to an amount of an aberration contained in a light beam radiated onto a recording surface of the recording medium, using an optical pickup system including a light source that emits the light beam having an optical power to record the mark on the recording medium and an objective lens that condenses the light beam to focus the light beam as an optical spot on the recording surface of the recording medium; and an optical power controller which controls the optical power output from the light source using the aberration signal, so as to have the light source output the optical power to record the mark, in which a deformation due to the aberration is compensated for, on the recording medium, wherein the optical power controller controls the optical power output from the light source so as to apply an optical power $P_4$, within a range of ±20% of a power $\gamma_4 P_0$ to record the mark, where the light source emits the light beam having a wavelength corresponding to a blue light, the numerical aperture of the objective lens is 0.85±0.05, a thickness of the recording medium is 0.1±0.05 mm, and a coma aberration corresponding to a coefficient $W_{31}$ of more than 0.15 occurs, and the power $\gamma_4 P_0$ is obtained by multiplying a recording power $P_0$ of the light source, in which the aberration does not occur, by a compensation coefficient $\gamma_4$ which satisfies the relationship: $\gamma_4 = 3.1 \times W_{31} + 0.7$.

8. A method of recording a mark on a recording medium, the method comprising:

detecting an aberration signal corresponding to an amount of an aberration contained in a light beam radiated onto a recording surface of the recording medium using an optical pickup system including a light source that emits a light beam having an optical power to record the mark on the recording medium and an objective lens that condenses the light beam to focus the light beam as an optical spot on the recording surface of the recording medium;

controlling the optical power output from the light source using the aberration signal, so as to have the light source output the optical power to record the mark, in which a deformation due to the aberration is compensated for, on the recording medium; and recording the mark in which the deformation due to the aberration is compensated for using the light beam having the controlled optical power output from the light source, wherein the controlling of the optical power includes controlling the light source to apply an optical power $P_1$ within a range of ±20% of a power $\gamma_1 P_0$ to record the mark, where the light source emits the light beam having a wavelength corresponding to a blue light, the numerical aperture of the objective lens is 0.85±0.05, a thickness of the recording medium is 0.1±0.05 mm, and a spherical aberration corresponding to a coefficient $W_{40}$ of less than 0.15 occurs, and the power $\gamma_1 P_0$ is obtained by multiplying a recording power $P_0$ of the light source, in which the aberration does not occur, by a compensation coefficient $\gamma_1$ which satisfies the relationship: $\gamma_1 = 1.9 \times W_{40} + 0.91$.

9. The method of claim 8, wherein the detecting of the aberration signal includes detecting the aberration signal corresponding to at least one of a spherical aberration due to a thickness variation of the recording medium, a first-type coma aberration due to a radial tilting of the recording medium, and a second-type coma aberration due to a tangential tilting of the recording medium, so as to record the mark having the deformation being compensated for where at least one of the spherical, first-type coma and second-type coma aberrations occurs.

10. The method of claim 9, wherein the recording medium is a phase-change disc.

11. The method of claim 8, wherein the recording medium is a phase-change disc.

12. A method of recording a mark on a recording medium, the method comprising:

detecting an aberration signal corresponding to an amount of an aberration contained in a light beam radiated onto a recording surface of the recording medium using an optical pickup system including a light source that emits a light beam having an optical power to record the mark on the recording medium and an objective lens that condenses the light beam to focus the light beam as an optical spot on the recording surface of the recording medium;

controlling the optical power output from the light source using the aberration signal, so as to have the light source output the optical power to record the mark, in which a deformation due to the aberration is compensated for, on the recording medium; and recording the mark in which the deformation due to the aberration is compensated for using the light beam having the controlled optical power output from the light source, wherein the controlling of the optical power includes controlling the light source to apply an optical power $P_2$ within a range of ±20% of a power $\gamma_2 P_0$ to record the mark, where the light source emits the light beam having a wavelength corresponding to a blue light, the numerical aperture of the objective lens is 0.85±0.05, a thickness of the recording medium is 0.1±0.05 mm, and a spherical aberration corresponding to a coefficient $W_{40}$ of more than 0.15 occurs, and the power $\gamma_2 P_0$ is obtained by multiplying a recording power $P_0$ of the light source, in which aberration does not occur, by a compensation coefficient $\gamma_2$ which satisfies the relationship: $\gamma_2 = 4 \times 0.6$.

13. A method of recording a mark on a recording medium, the method comprising:

detecting an aberration signal corresponding to an amount of an aberration contained in a light beam radiated onto a recording surface of the recording medium using an optical pickup system including a light source that emits a light beam having an optical power to record the mark on the recording medium and an objective lens that condenses the light beam to focus the light beam as an optical spot on the recording surface of the recording medium;

controlling the optical power output from the light source using the aberration signal, so as to have the light source output the optical power to record the mark, in which a deformation due to the aberration is compensated for, on the recording medium; and recording the mark in which the deformation due to the aberration is compensated for using the light beam having the controlled optical power output from the light source wherein the controlling of the optical power includes controlling the light source to apply an optical power $P_3$ within a range of ±20% of a power $\gamma_3 P_0$ to record the mark, where the light source emits the light beam having a wavelength corresponding to a blue light, the numerical aperture of the objective lens is 0.85±0.05, a thickness of the recording medium is 0.1±0.05mm, and a coma aberration corresponding to a coefficient $W_{31}$ of less than 0.15 occurs, and the power $\gamma_3 P_0$ is obtained by multiplying a recording power $P_0$ of the light source, in which aberration does not occur, by a compensation coefficient $\gamma_3$ which satisfies the relationship: $\gamma_3 = 1.5 \times W_{31} + 0.94$.

14. A method of recording a mark on a recording medium, the method comprising:

detecting an aberration signal corresponding to an amount of an aberration contained in a light beam radiated onto a recording surface of the recording medium using an optical pickup system including a light source that emits a light beam having an optical power to record the mark on the recording medium and an objective lens that condenses the light beam to focus the light beam as an optical spot on the recording surface of the recording medium;

controlling the optical power output from the light source using the aberration signal, so as to have the light source output the optical power to record the mark, in which a deformation due to the aberration is compensated for, on the recording medium; and recording the mark in which the deformation due to the aberration is compensated for using the light beam having the controlled optical power output from the light source wherein the controlling of the optical power includes controlling the light source to apply an optical power $P_4$ within a range of ±20% of a power $\gamma_4 P_0$ to record the mark, where the light source emits the light beam having a wavelength corresponding to a blue light, the numerical aperture of the objective lens is 0.85±0.05, a thickness of the recording medium is 0.1±0.05 mm, and a coma aberration corresponding to a coefficient $W_{31}$ of more than 0.15 occurs, and the power $\gamma_4 P_0$ is obtained by multiplying a recording power $P_0$ of the light source, in which aberration does not occur, by a compensation coefficient $\gamma_4$ which satisfies the relationship: $\gamma_4 = 3.1 \times W_{31} + 0.7$.

15. The recording apparatus of claim 1, wherein the spherical aberration detecting part detects a signal corresponding to a spherical aberration resulting from a thickness variation of the recording medium; and the coma aberration detecting part detects a signal corresponding to a coma aberration caused by a tilting of the recording medium.

16. The recording apparatus of claim 1, wherein the optical power controller increases the optical power to record the mark according to the amount of the aberration.

17. The method of claim 8, wherein the controlling of the optical power includes controlling the light source to increase the optical power according to the amount of the aberration.

18. The recording apparatus of claim 1, wherein the optical power controller changes the optical power of the light beam according to the aberration signal so as to control a position of the mark on the recording medium.

19. The recording apparatus of claim 1, wherein the optical power controller increases the optical power according to the amount of the aberration to position the mark on a desired area of the recording medium.

* * * * *

UNITED STATES PATENT AND TRADEMARK OFFICE
CERTIFICATE OF CORRECTION

PATENT NO. : 7,095,703 B2 Page 1 of 1
APPLICATION NO. : 10/374715
DATED : August 22, 2006
INVENTOR(S) : Seong-sue Kim et al.

It is certified that error appears in the above-identified patent and that said Letters Patent is hereby corrected as shown below:

Column 11, line 46, change "20%" to -- ± 20% --

Column 13, line 33, change "$\gamma_2 = 4\text{x}0.6$" to -- $\gamma_2 = 4\text{x}W_{40} + 0.6$ --

Column 13, line 53, insert -- , -- after "source" and start new paragraph Column 13, line 61, start new paragraph after "and"

Column 14, line 24, insert -- , -- after "source"

Signed and Sealed this

Thirteenth Day of February, 2007

JON W. DUDAS
*Director of the United States Patent and Trademark Office*